United States Patent [19]

Adachi et al.

[11] Patent Number: 4,838,357
[45] Date of Patent: Jun. 13, 1989

[54] SOIL TILLING MACHINE

[75] Inventors: Hitoyuki Adachi, Yasugi; Masahiro Ozoe, Yonago, both of Japan

[73] Assignee: Mitsubishi Agricultural Machinery Co., Ltd., Shimane, Japan

[21] Appl. No.: 29,982

[22] Filed: Mar. 25, 1987

[30] Foreign Application Priority Data

Apr. 4, 1986 [JP] Japan .................................. 61-077842
Jul. 28, 1986 [JP] Japan .................................. 61-176996

[51] Int. Cl.[4] ........................................... A01B 63/111
[52] U.S. Cl. ......................................... 172/43; 172/75
[58] Field of Search ...................... 172/42, 43, 75, 125

[56] References Cited

U.S. PATENT DOCUMENTS

| | | | |
|---|---|---|---|
| 3,180,428 | 4/1965 | Price | 172/42 |
| 4,139,064 | 2/1979 | Dobberphul | 172/125 |
| 4,660,649 | 4/1987 | Anderson et al. | 172/75 |
| 4,719,974 | 1/1988 | Kanai et al. | 172/43 |

*Primary Examiner*—Deborah L. Kyle
*Assistant Examiner*—J. Woodrow Eldred

*Attorney, Agent, or Firm*—Wenderoth, Lind & Ponack

[57] ABSTRACT

A selector or shift lever manipulates gears in a ground wheel transmission to select a running mode when moved in the transverse direction, and manipulates gears in a plow transmission to select the rotating direction of a rotary plow when moved in the vertical direction. A drag bar is mounted on a machine frame, slidable in the vertical direction, the vertical movement of the drag bar being interlocked with the vertical movement of the selector lever through rods and links. Hence, when the selector lever is moved downward to select forward rotation of the rotary plow, the drag bar is moved down into the ground in coordination, subjecting the soil tilling machine to great resistance from the ground, to enable a tilling operation to be performed while preventing lunging foward of the machine. When the selector lever is moved upward to select reverse rotation of the rotary plow, the drag bar is moved upward to let the soil tilling machine perform the tilling operation without receiving much resistance from the ground.

9 Claims, 8 Drawing Sheets

SOIL TILLING MACHINE

BACKGROUND OF THE INVENTION (1) Field of the Invention

The present invention relates to power operated soil tilling machines of the walk-behind type having integrally incorporated rotary plows, and more particularly, to soil tilling machines equipped with drag which penetrate the earth to provide resistance against forward movement.

(2) Description of the Prior Art

Soil tilling machines in general are equipped with rotary plows rotatable in either forward or reverse directions, and are controlled by an operator holding handle bars and walking alongside or behind the machine, tilling fields with blades on the rotating plows and agitating the soil while rotating the plow in forward or reverse directions.

Such soil tilling machines however, tend to lunge forward when the plows are rotating in, the forward direction when tilling hard ground, or on the plow encountering hard objects such as rocks buried in the earth, presenting danger to the operator walking behind the machine holding the handle bars with both hands, by suddenly pulling at the operator and causing the operator to fall forward.

With the introduction of small sized soil tilling machines with integrally incorporated rotary plows in recent years, the demand for safety as well as ease of operation has grown, because such machines are frequently operated by inexperienced amateurs on private home gardens.

OBJECTS OF THE INVENTION

An object of the present invention is to prevent the lunging forward of such a soil tilling machine, by automatically increasing the resistance against forward movement when the plow is rotating in the forward direction.

Another object of the present invention is to facilitate the operation of the soil tilling machine, by controlling the rotation of the ground wheels and the rotary plow with a single selector lever.

Other objcts and advantages of the present invention shall become clear from the following description.

SUMMARY OF THE INVENTION

The present invention is characterised by the provision of a drag movable in the vertical direction, which is interlocked with the selector lever in such a way that the drag bar is lowered when the selector lever switches the plow to rotate in the forward direction, and raised when the selector lever switches the plow to rotate in the reverse direction.

Because of this arrangement, when the plow is rotated in the forward direction by operating the selector lever, the drag bar is moved downward beyond the ground contact point of the tilling machine, so that the machine performs the tilling operation while being subjected to great resistance from the ground, caused by the drag bar. On the other hand, when the plow is rotated in the reverse direction by operating the selector lever, the drag bar is raised clear of the ground, so that the machine performs the tilling operation without being subjected to much resistance from the ground.

DETAILED DESCRIPTION OF THE PREFERRED EMBODIMENT

Figure 1:
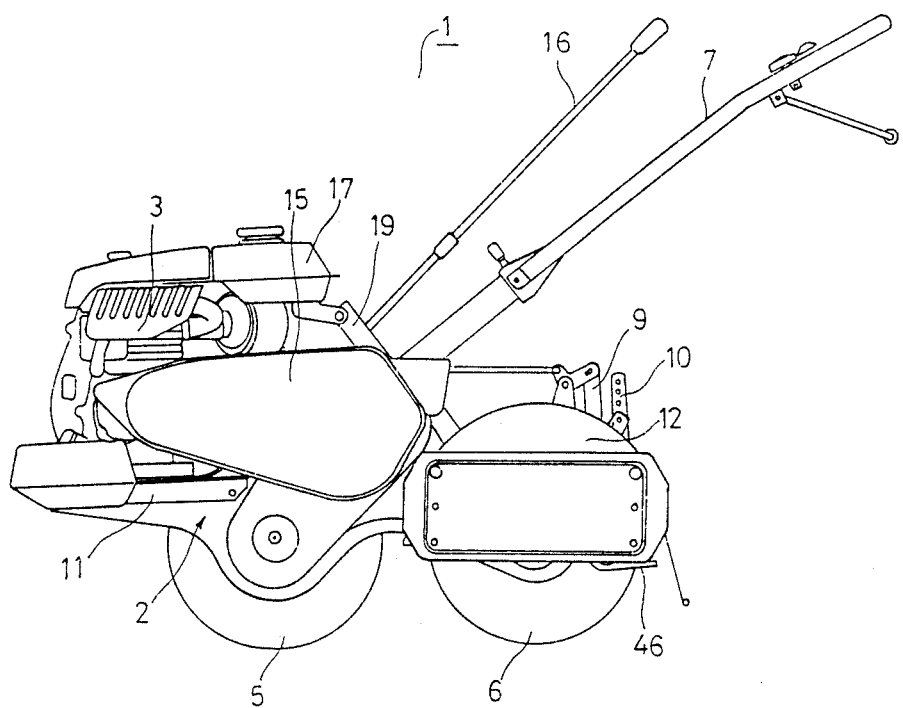
FIG. 1 is an overall side elevation view of the soil tilling machine embodying the present invention.

As illustrated in FIG. 1, the soil tilling machine 1 comprises a transmission housing 2, forming a body frame, engine 3, ground wheels 5, rotary plow 6, handle bars 7, drag bar 9 and tilling depth control guide 10. The transmission housing 2 comprises a pair of press formed housing halves of large dimensions (refer to FIG. 2), to the front ends of which is fixed an engine frame 11 for mounting of the engine 3, and provided with a plow cover 12 at the rear over the rotary plow. The pair of handle bars 7 extend rearwardly and outwardly from the transmission housing, while the ground wheels 5 and rotary plow 6 are mounted at opposite ends of the inverted V shaped housing 2. A drive belt is fitted around an output pulley of the engine 3 and a pulley located on an input shaft 13 on the transmission housing 2 (refer to FIGS. 5 and 6), the belt being subjected to tensioning and relieving by an idler pulley which constitutes a main clutch. The belt and pulleys are concealed within a cover 15.

Figure 7:
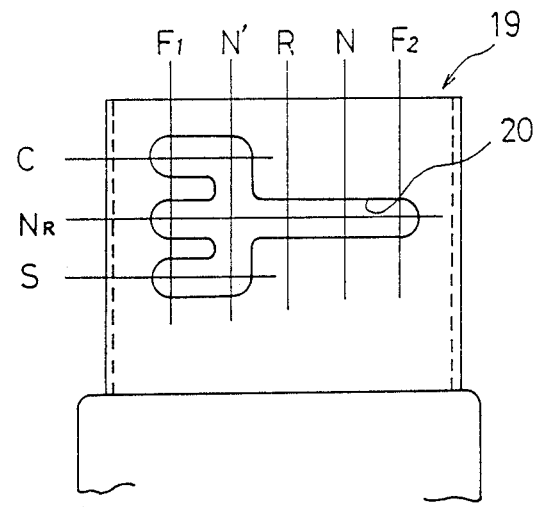
FIG. 7 is a frontal view illustrating the guide slots provided on the guide plate.
Figure 8:
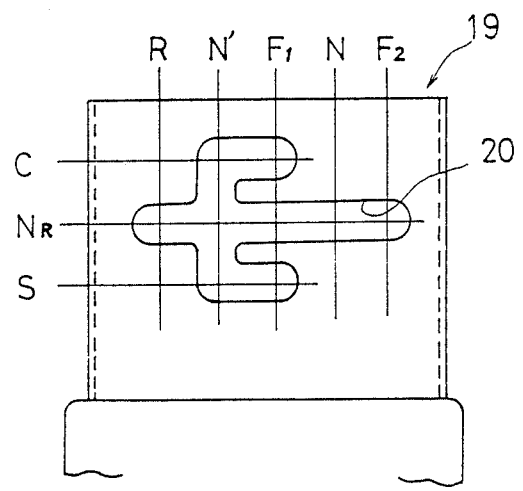
FIG. 8 is a frontal view illustrating partly modified guide slots porivded on the guide plate.

A selector, or control lever 16 projects from the top of the transmission housing 2 and extends along the top of handle bar 7, the selector lever 16 being guided to move through guide slots 20 (refer to FIGS. 7 and 8), provided on a guide plate 19 disposed in between a fuel tank 17 and transmission housing 2. The guide plate thus supports the fuel tank 17, and at the same time covers the upper rear portion of the engine 3 together with the fuel tank 17. The guide slots 20 on the guide plate 19, as illustrated in FIGS. 7 and 8, have ground wheel shift positions, forward first speed $F_1$, forward second speed $F_2$, neutral N, reverse R and work neutral N' distributed along the transverse (left-right) direction, and plow shift positions, forward S, neutral $N_R$ and reverse C distributed along the vertical (up-down) direction.

Figure 3:
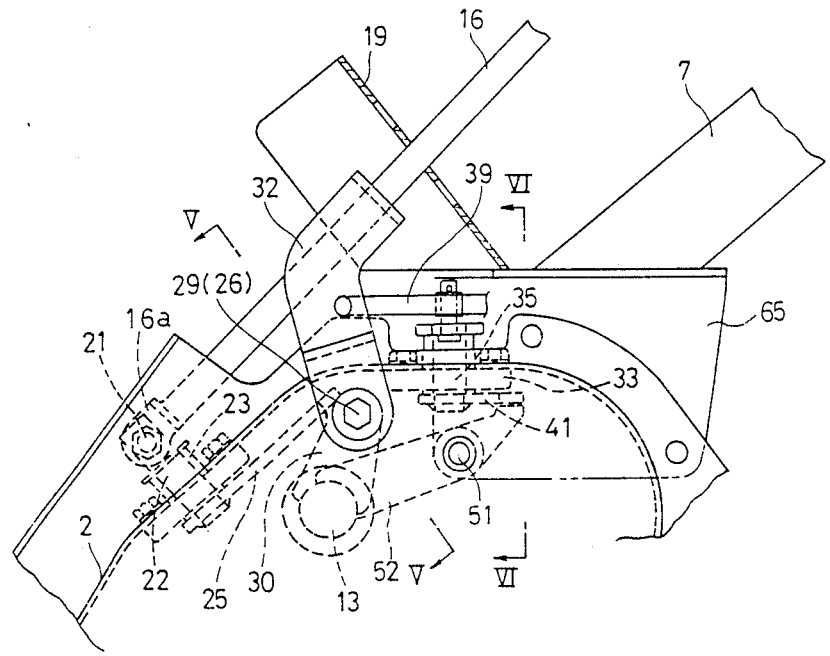
FIG. 3 is a side elevation view of the transmission for the machine illustrated in FIG. 1.
Figure 4:
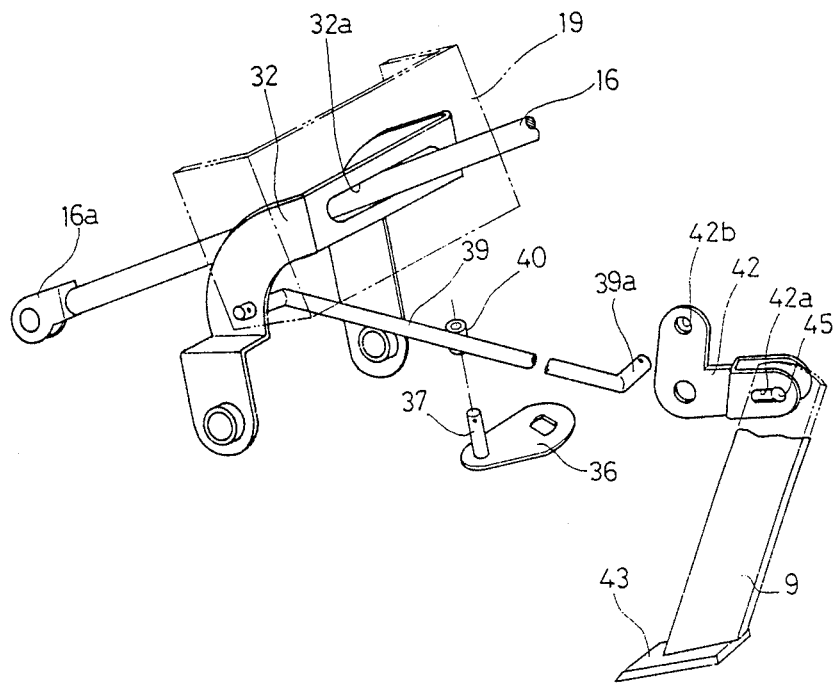
FIG. 4 is a perspective view illustrating the interlocking arrangement between the selector lever and the drag bar.
Figure 5:
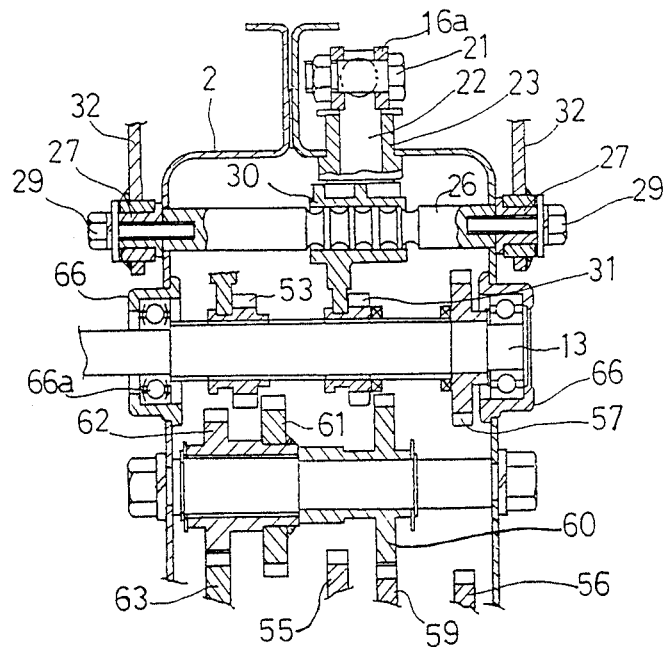
FIG. 5 is a cross sectional view taken through line V—V in FIG. 3.

As illustrated in FIGS. 3, 4 and 5, a forked base end 16a of the selector lever 16 is connected to a first shifter 22 by bolt pin 21 so that the base end 16a and the shifter are free to rotate relatively against each other in the vertical plane yet move in unison transversely. The first shifter 22 is rotatably supported in a collar 23 fixed to the transmission housing 2, and has a shift arm 25 welded to its inner end within the housing 2.

As illustrated in FIG. 5, a ground wheel shift guide shaft 26 spans across the transmission housing 2 and has ends which are fixed to the housing 2 through collars, 27 by bolts 29. A shift yoke 30 is slidably mounted over guide shaft 26, and is located at required positions along the guide shaft 26 by a click-stop arrangement. The shift yoke 30 is operatively connected to the shift arm 25, and is engaged with a ground wheel shift pinion 31, which is slidably and drivingly mounted on the input shaft 13 through splines.

An interlocking arm 32 is rotatably supported on the collars 27 holding the guide shaft 26. An elongated opening 32a is provided in the interlocking arm 32 in the transverse direction, through which the selector lever 16 projects. The interlocking arm 32 is thus rotated about the collars 27 when the selector lever 26 is moved in the vertical plane, while any transverse movement of the selector lever is in the elongated opening 32a and not transmitted to the interlocking arm 32.

Figure 6:
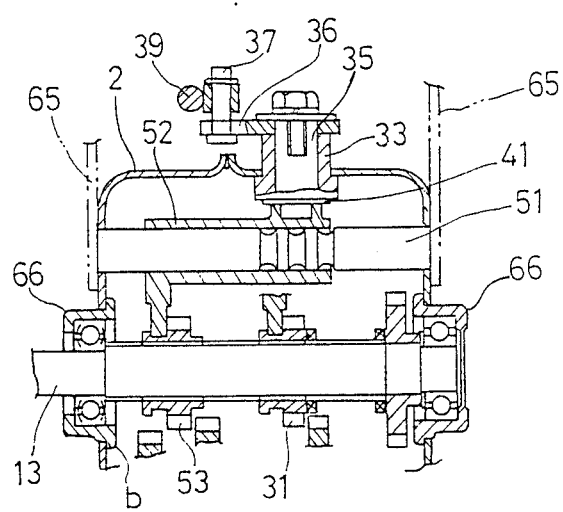
FIG. 6 is a cross sectional view taken through line VI—VI in FIG. 3.

As illustrated in FIG. 6, a second shifter 35 for the rotary plow is rotatably supported by a collar 33 fixed to the transmission housing 2. One end of an arm 36 is fixed to the external end of the second shifter 35 projecting from the housing 2, and to the the other end of the arm 36 is fixed a pin 37, which is pivoted to a rod 39 connected to the interlocking arm 32 through a tube 40, as illustrated in FIG. 4. To the internal end of the second shifter 35 is welded a second shift arm 41 for the rotary plow (refer to FIG. 3).

As illustrated in FIGS. 3, 5 and 6, a plow shift guide shaft 51 spans the transmission housing 2 adjacent to the ground wheel shift guide shaft 26. A shift yoke 52 is slidably mounted on the guide shaft 51, and is located at required positions along the guide shaft 51 by a click-stop arrangement. The shift yoke 52 is operatively connected to the second shift arm 41, and engages a plow shift pinion 53 mounted slidably and drivingly on the input shaft 13 through splines.

Forward first speed is obtained by the ground wheel shift pinion 31 engaging a pinion 55, forward second speed by the pinion 31 engaging a pinion 57 meshed with a pinion 56, and reverse by the pinion 31 engaging a pinion 60 meshed with a pinion 59. Forward rotation of the rotary plow is obtained by the plow shift pinion 53 engaging a pinion 61, and reverse rotation by the pinion 53 engaging a pinion 63 meshed with a pinion 62. The rotation in the drive train for the ground wheels is transmitted to the ground wheels 5 through a chain and differential gears, while the rotation in the drive train for the rotary plow is transmitted to the rotary plow through a chain.

The handle bars 7 are attached to the transmission housing 2 through an inverted U shaped bracket 65 fitted over the housing, the bracket also serving to hold the plow shift guide shaft 51 in place, as indicated in FIGS. 3 and 6.

Figure 2:
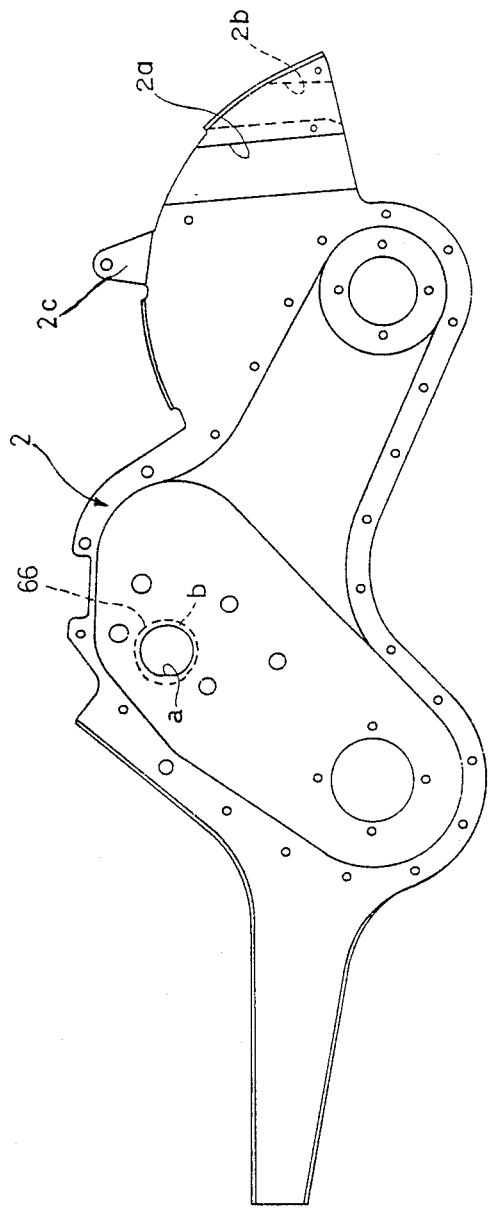
FIG. 2 is an enlarged side view of the transmission housing for the machine illustrated in FIG. 1, comprising two housing halves.

As illustrated in FIGS. 2 and 5, the input shaft 13 is rotatably supported by sealed bearings 66a contained within bearing holders 66 attached to the transmission housing 2. Each bearing holed 66 is located on the transmission housing by straight edges a provided on both bearing holder 66 and housing 2 preventing relative rotation and flange b preventing relative axial displacement. The bearing holders 66 are thus fixed securely in a simple and inexpensive manner. The sealing of bearings 66a can be simple, as the bearings are grease lubricated in the present embodiment.

Figure 9:
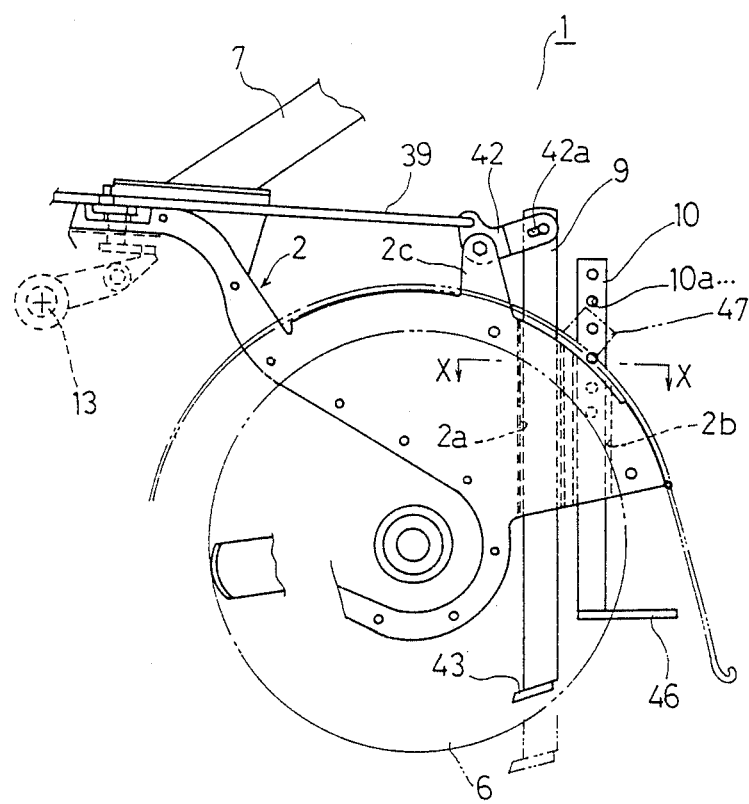
FIG. 9 is an enlarged side elevation view of the rear section of the soil tilling machine.
Figure 10:
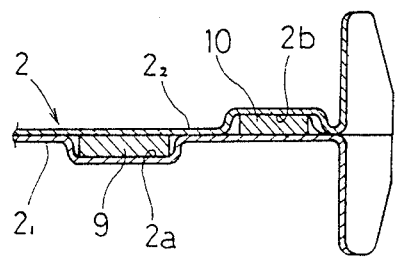
FIG. 10 is a cross sectional view taken through line X—X in FIG. 9.

As illustrated in FIGS. 9 and 10, at the rear of the transmission housing 2, slideways 2a and 2b are press formed into respective portions $2_1$ and $2_2$ of the press formed housing halves slideways 2a, 2b slidably supporting a drag bar 9 and a tilling depth control guide bar 10 respectively. A bracket 2c is formed atop the rear of the transmission housing 2, with a bell crank 42 pivoted thereto to swing in a longitudinal vertical plane.

One leg of the bell crank 42 is forked, with an elongated opening 42a provided legthwise, and the other leg is provided with an opening 42b. The drag bar 9 is provided at its lower end with a drag plate 43, while its top end is lodged in between the forked leg of bell crank 42 with a pivot pin 45 piercing the top of the drag bar through the elongated opening 42a, so that the drag bar 9 would slide vertically when the bell crank 42 is swung. A hooked end 39a of the rod 39 is rotatably inserted through the opening 42b in the other leg of the bell crank 42. Hence pulling on the rod 39 will cause the bell crank to swing forward, and the drag bar 9 to slide upward.

The tilling depth control guide 10 is provided with a series of openings 10a along its length, and a glide plate 46 at its lower end, with its top end projecting upward from the plow cover 12. A U-shaped bracket 47 is located atop the plow cover 12 surrounding the depth control bar 10, with a cotter pin piercing the bracket 47. By inserting the pin through one of the openings 10a in the depth control guide bar, the heigh of the depth control guide 10 and glide bar plate 46 is adjusted to obtain the required tilling depth. Needless to say, the means for adjusting and fixing the height of the depth control guide bar 10 need not be restricted to that utilising a cotter pin as described above, but may be of any other appropriate variety.

Figure 11:
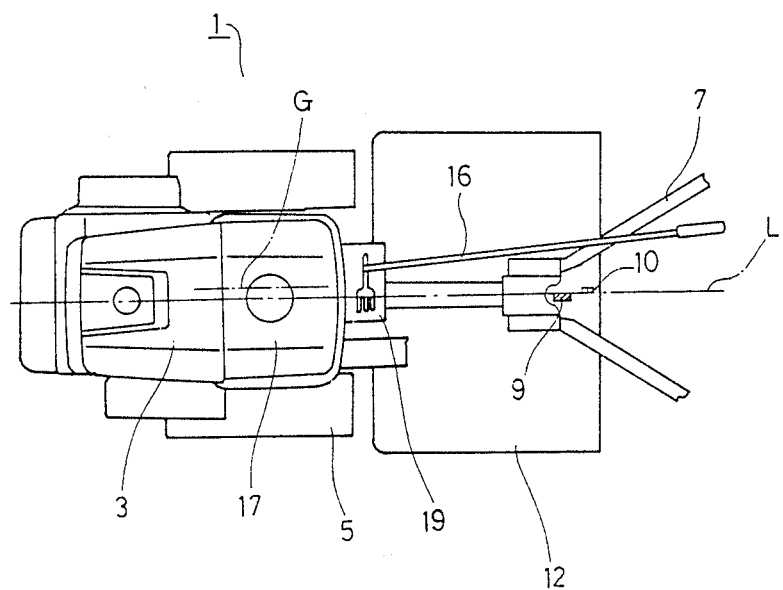
FIG. 11 is an overall plan view of the soil tilling machine of the present invention.

As illustrated in FIG. 10, the slide way 2a for the drag bar 9 is press formed on one of the press formed housing half portions $2_1$ comprising the transmission housing 2, while the slide way 2b for the depth control bar 10 is press formed on the other press formed housing half portions $2_2$, the two enclosed slide ways being completed by a flat surface provided by the opposing housing half portions. The drag bar 9 and depth control bar 10 are hence offset to each side of a center line $L$ of the tilling machine, as indicated in FIG. 11. The drag bar 9 in particular, which produceds great resistance against forward movement, should be offset to the side opposite to the center of gravity G of the tilling machine. This is because the center of gravity G of the tilling machine is normally offset to one side with respect to the center line L of the tilling machine, due to the engine 3 being offset to one side from center line L, an arrangement necessitated by the layout of the drive train. A deviating force tending to deflect the machine in the direction of the center of gravity offset would hence be counteracted by the resistance provided by the drag bar 9 offset in the other direction, thus making corections to the line of machine movement.

With an embodiment of the present invention constructed as described above, the power output of the engine 3 is transmitted to the input shaft 13 to the transmission housing 2 through a drive belt located under cover 15. When the operator moves the selector lever 16 in a transverse (left-right) direction along guide slot 20 in the guide plate 19, the movement of the selector lever is transmitted to the ground wheel shift yoke 30 through the first shifter 22 and shift arm 25, causing the shift yoke 30 to slide along the ground wheel shift guide shaft 26, locating it at a required position corresponding to the indication on the guide plate.

For example, when the selector lever 16 is moved from neutral position N to forward second speed $F_2$, the shift yoke 30 causes the first shift pinion 31 to engage pinion 57, and the tilling machine to run at a high speed suitable for non-tilling run. By moving the selector to reverse position R, the shift pinion 31 engages pinion 60 for running in reverse direction. As the selector lever 16 is moved in transverse directions, it merely slides through the elongated opening 32a in the interconnecting lever 32 without affecting the interconnecting lever, maintaining it in neutral position $N_R$ where no rotation is transmitted to the plow.

When the selector lever 16 is moved in the vertical (up-down) direction along the guide slot while it is in work neutral position N' on the guide plate 19, the interconnecting arm 32 is rotated in the vertical plane about the ground wheel shift guide shaft 26. Then the second shifter 35 for the rotary plow is rotated through rod 39 and arm 36, causing the second shift yoke 52 to slide along the plow shift guide shaft 51 through shifting arm 41, locating it at the required position corresponding to the indication on the guide plate.

For example, when the selector lever 16 is moved from neutral position $N_R$ to forward position S, the shift yoke 52 causes the second shift pinion 53 to engage pinion 61 to transmit rotation to the rotary plow in the same sense as the advancing direction of the tiller machine. At the same time, rod 39 is moved rearward in coordination with the selector lever 16, rotating the bell crank 42 rearward with its hooked end 39a. The bell crank 42 then pushes the drag bar 9 and drag plate 43 downward, as the pin 45 slides along the elongated opening 42a. Thus the drag plate 43 is buried deep into the soil to produce great resistance to forward movement, which prevents lunging forward of the soil tilling machine under reacting force from the ground caused by the rotary plow.

By moving the selector lever 16 to reverse position C, the shift pinion 53 is caused to engage pinion 63 to transmit rotation to the rotary plow in the sense opposite to the advancing direction of the machine. Under this condition, the interlocking arm 32 is rotated forward, causing rod 39 to move the drag bar 9 upward through the bell crank 42. Thus the drag plate 43 is lifted to a shallow position, and does not produce much resistance.

With the selector lever 16 moved up or down from the neutral position, when the lever 16 is moved transversely along guide slot 20 to forward first speed position $F_1$, the first shift pinion 31 is caused to engage pinion 55 by the first shifter 22, shift arm 25 and shift yoke 30, to transmit a slow rotation suitable for tilling work to the ground wheels 5. Thus, the tilling machine advances with the rotary plow rotating in either the forward or reverse direction, to perform a tilling operation.

On hard soil, adjustment of tilling depth by depth control guide bar 10 with glide plate 46 is not necessary, because the tilling depth is determined by the drag bar 9. However, on soft soil, the rotary plow may not be supported by the drag bar 9 alone. In such case, the position of the depth control guide bar 10 is adjusted manually, and the tilling operation is performed while supporting the rotary plow 6 with the glide plate 46.

As described above, according to the present invention, the drag bar 9 is automatically lowered or raised by simply operating the selector lever 16 to select either forward or reverse rotation of the rotary plow according to soil conditions, as the vertically slidable drag bar 9 and the selector lever 16 are interconnected in such a way that the drag bar is lowered when the selector lever 16 is shifted to rotate the plow 6 in the forward direction, and raised when the selector lever is shifted to rotate the plow in the reverse direction. Thus, when the rotary plow 6 is rotating in the forward direction, lunging forward of the soil tilling machine can be avoided by burying the drag plate deep into the soil, whereas the drag bar is raised when the rotary plow is rotating in the reverse direction, to enable effective tilling in either direction. Hence, even inexperienced operators working in home gardens can safely and effectively perform the tilling operation.

Also, as the running modes of the tilling machine and the rotation of the rotary plow can be selected by a single selector lever 16, operation of the machine is extremely simplified, enabling inexperienced operators to work without difficulty. At the same time, the number of components is reduced, enabling lower production cost and a more lightweight and compact construction, which in turn facilitate transportation and installation in the garden.

Further, by arranging the guide slot 20 in the guide plate 19 with the ground wheel shift positions with the larger number of positions distributed along the transverse direction, and with the plow shift positions with a lesser number of positions distributed along the vertical direction, it is possible to provide a large number of ground wheel shift positions taking advantage of the ample width of the tilling machine, while restricting the height of the guide plate to obtain a compact design.

Also, as the guide plate 19 is erected behind the engine 3 and over the attachment bracket 65 for the handle bars, the guide plate 19 can be made relatively large even on small tilling machines for use on home gardens, so that the selector lever 16 can be operated at comfortable strokes following large sized indications, to improve the operating comfort of the machine.

By covering the rear upper portion of the engine 3 with the fuel tank 17 and guide plate 19, the air cleaner and other components such as governor links located at the rear of the engine can be concealed from the operator's sight to improve the external appearance of the machine without providing a special cover.

As the guide plate 19 also serves as a support for the fuel tank 17, the number of components and hence the weight of the machine can be reduced to facilitate loading and unloading to and from vehicles and improve its ease of handling without impairing the external appearance of the machine.

As the drag bar 9 is disposed on the transmission housing 2 offset to the side opposite to the center of gravity G with respect to the machine center line L, the ground resistance produced by the drag bar 9 cancels the tendency for the machine to deviate towards the side to which the center of gravity G is offset, enabling the tilling machine to run forward in a straight line, thus improving the operator's feeling of control. The slide way 2a for the drag bar 9 can be easily provided by press forming it simultaneously with the press forming of the transmission housing 2. It is therefore unnecessary to provide any special fitting for mounting of the drag bar, which further reduces the number of components and enables a reduction in costs.

What is claimed is:

1. A soil tilling machine comprising:
   a machine frame;
   a rotary plow incorporated with said machine frame;
   means for switching a rotation of said rotary plow from a forward direction to a reverse direction;
   a drag bar movably mounted with respect to said machine frame; and
   means for interlocking movement of said drag bar with said means for switching such that said drag bar is lowered when the rotation of said plow is switched to said forward direction, and raised when the rotation of said plow is switched to said reverse direction.

2. The soil tilling machine of claim 1, wherein said means for switching rotation of said rotary plow comprises a selector lever.

3. The soil tilling machine of claim 2, and further comprising:
   a ground wheel and ground wheel transmission arranged on said machine frame;
   a plow transmission arranged on said machine frame;
   means for allowing said selector lever to move in both transverse and vertical directions;
   means for allowing gears in said ground wheel transmission to be shifted without affecting gears in said plow transmission when said selector lever is moved in said transverse direction; and
   means for allowing said gears in said plow transmission to be shifted without affecting said gears in said ground wheel transmission when said selector lever is moved in said vertical direction.

4. The soil tilling machine of claim 3, and further comprising:
   handle bars attached to said machine frame;
   a guide plate fixed above a base end of said handle bars and having guide slots;
   an engine mounted on said machine frame; and
   a fuel tank supported by said guide plate over said engine, said fuel tank and guide plate together serving as a cover for a rear upper portion of said engine.

5. The soil tilling machine of claim 4 wherein said guide slots of said guide plate receive said selector lever.

6. The soil tilling machine of claim 5 wherein said guide plate guide slots comprise a relatively long transverse guide slot for a relatively large number of ground wheel shift positions, and a relatively short vertical guide slot for a relatively smaller number of rotary plow shift positions.

7. The soil tilling machine of claim 2, wherein said means for interlocking movement of said drag bar with said means for switching comprises:
   a rotatably supported interlocking arm vertically movable by said selector lever;
   a rod connected at one end thereof to said interlocking arm so as to be moved by vertical movement of said interlocking arm; and
   a rotatably supported bell crank connected to the other end of said rod and to an upper end of said drag bar, whereby vertical movement of said interlocking arm by said selector lever causes said rod to rotate said bell crank, and thereby move said drag bar.

8. The soil tilling machine of claim 7, wherein said interlocking arm includes a transverse elongated opening receiving said selector lever, such that said selector lever will slide in said opening when moved transversely.

9. The soil tilling machine of claim 1, wherein:
   said machine frame includes a transmission housing comprising a pair of press formed housing halves disposed on opposite sides of a centerline of the soil tilling machine;
   the center of gravity of the soil tilling machine is offset to one side of said centerline;
   said housing half disposed on the side opposite said center of gravity is formed with a channel for vertically guiding said drag bar; and
   a slideway for said drag bar is formed by said channel and a flat surface of the other housing half, said drag bar thus being offset, with respect to said centerline of the soil tilling machine, to the side of the machine opposite said center of gravity offset.

* * * * *